US007160469B2

(12) United States Patent
Mayer et al.

(10) Patent No.: US 7,160,469 B2
(45) Date of Patent: Jan. 9, 2007

(54) SYSTEM AND METHOD FOR EFFICIENT AND LOW ENERGY DESALINATION OF WATER

(76) Inventors: Yaron Mayer, 21 Ahad Haam Street, Jerusalem 92151 (IL); Boris Dechovich, Hasayeret Hayerushalmit 16/6, Jerusalem 97543 (IL); Haim Gadassi, Hamagid 17, Jerusalem 93114 (IL)

( * ) Notice: Subject to any disclaimer, the term of this patent is extended or adjusted under 35 U.S.C. 154(b) by 215 days.

(21) Appl. No.: 10/328,621

(22) Filed: Dec. 26, 2002

(65) Prior Publication Data

US 2003/0146158 A1 Aug. 7, 2003

Related U.S. Application Data

(63) Continuation-in-part of application No. PCT/IL02/00806, filed on Oct. 3, 2002.

(60) Provisional application No. 60/422,183, filed on Oct. 25, 2002, provisional application No. 60/417,675, filed on Oct. 7, 2002, provisional application No. 60/344,653, filed on Dec. 28, 2001.

(30) Foreign Application Priority Data

Oct. 3, 2001 (IL) ..................................... 145740

(51) Int. Cl.

| | |
|---|---|
| ***C02F 1/04*** | (2006.01) |
| ***C02F 1/38*** | (2006.01) |
| ***C02F 1/48*** | (2006.01) |
| ***B01D 3/08*** | (2006.01) |
| ***B04B 1/00*** | (2006.01) |
| ***B04B 1/04*** | (2006.01) |

(52) U.S. Cl. ...................... 210/695; 210/787; 210/223; 210/297; 210/360.1; 210/380.1; 210/512.3; 494/37; 494/43; 203/10; 159/4.2; 159/48.1; 159/48.2

(58) Field of Classification Search ................ 210/651, 210/695, 787, 223, 297, 321.68, 360.1, 380.1, 210/512.3; 494/37, 43; 159/4.2, 48.1, 48.2; 203/10

See application file for complete search history.

(56) References Cited

U.S. PATENT DOCUMENTS

| | | | | |
|---|---|---|---|---|
| 3,400,074 A * | 9/1968 | Grenci | .................... | 210/360.1 |
| 3,669,879 A | 6/1972 | Berriman | | |
| 4,170,328 A | 10/1979 | Kirk et al. | | |
| 4,323,424 A | 4/1982 | Secunda et al. | | |
| 4,886,597 A | 12/1989 | Wild et al. | | |
| 4,891,140 A | 1/1990 | Burke | | |
| 5,207,928 A | 5/1993 | Lerner | | |

(Continued)

FOREIGN PATENT DOCUMENTS

| | | |
|---|---|---|
| ES | 2018732 | 5/1991 |

(Continued)

*Primary Examiner*—David A. Reifsnyder

(57) ABSTRACT

Many areas in the world already suffer shortages of water, and others will suffer from it in the coming years. Therefore more efficient water sweetening is essential for our survival on this planet. The most commonly used water sweetening methods are: Reversed osmosis, distillation, electrodyalisis, and partial freezing. However, these methods suffer from low efficiency and high energy consumption, thus making them significantly more expensive than naturally obtained water. The present invention describes a system & method for efficient and low energy sweetening of water, based on borderline fast fluctuation between liquid to gaseous state and back, by using centrifugal forces to make water droplets fly at a high speed, so that they evaporate for a split second, the salt is separated, and they condense again. The present invention tries to make the process energy-efficient by enabling the use of lower speeds and smaller droplet sizes and solving various problems involved with that.

29 Claims, 3 Drawing Sheets

U.S. PATENT DOCUMENTS 5,425,883 A 6/1995 Reid et al.
5,593,378 A 1/1997 Dyck

FOREIGN PATENT DOCUMENTS

WO WO0110526 2/2001

* cited by examiner

SYSTEM AND METHOD FOR EFFICIENT AND LOW ENERGY DESALINATION OF WATER

This patent application is a continuation-in part of PCT application PCT/IL 02/00806 which was filed in Israel on Oct. 3, 2002, hereby incorporated by reference in its entirety, which claims priority from Israeli patent application 145740 of Oct. 3, 2001 and from U.S. provisional patent application 60/344,653 of Dec. 28, 2001.

This patent application claims benefit and priority from PCT application PCT/IL 02/00806 of Oct 3, 2002.

This patent application also claims benefit and priorities from the following U.S. Provisional patent applications, hereby incorporated by reference in their entirety:

60/344,653 of Dec. 28, 2001.

60/417,675 of Oct. 7, 2002.

60/422,183 of Oct. 25, 2002

BACKGROUND OF THE INVENTION

1. Field of the Invention

The present invention relates to desalination of water, and more specifically to a system & method for efficient and low energy desalination of water, based on borderline fast fluctuation between liquid to gaseous state and back.

2. Background

According to the World Watch 2000 report we are depleting the planet's water resources at the rate of 109 billion gallons of water per day. Many areas in the world already suffer shortages of water, and others will suffer from it in the coming years. Israel, for example, is now in a critical stage of water shortage, with the Kineret sea's water level already at a critically low level. Therefore more efficient water sweetening is essential for our survival on this planet.

The most commonly used water sweetening methods are: Reversed osmosis, distillation, electrodyalisis, and partial freezing. However, all of these methods suffer from low efficiency and high energy consumption, thus making them a number of times more expensive than naturally obtained water, which is one of the main reasons why they are not sufficiently implemented yet despite the general water shortages.

A new and much more efficient direction, based on a fast fluctuation on the borderline between liquid and gaseous states, has been described in a few recent patents: U.S. Pat. No. 4,323,424, issued on Apr. 6, 1982 to Secunda et. al., Spanish patent ES 2018732, issued on May 1, 1991 to Lumbreras & Gimenez, and U.S. Pat. No. 5,207,928, issued on May 4, 1993 to E. J. Lerner, describe methods for generating with compressed air, without heating, a stream of high velocity saltwater droplets, which for a split second vaporize because of the temporary vacuum created on their trail, allowing the salt to precipitate and fall, and then immediately condense again. These short-lived fluctuations are the key to much higher potential efficiency, because no extreme conditions of temperature or pressure are needed. However, mixing the water with compressed air enters too much air into the process, which limits the efficiency.

Also, these patents used too small droplets and with such droplets the salt particles that are created are too small to fall down and can mix again with the water. The 1982 patent, which was apparently the first to go in this direction, used droplet size of up to 6 micron, apparently didn't understand the real nature of the process, and was designed mainly for extracting the salt, without being able to properly extract also properly sweetened water.

European patent application number WO0110526, by Aquasonics Corp., which quotes the above mentioned patents, describes a better process, in which, without air pressure, salty water is injected though an array of vertical nozzles (with internal diameter of about 0.75–1.23 mm each) by a pressure of approx. 10 atmospheres, creating water droplets with sizes of about 30–100 micron each and sonic speeds of about 300 meters per seconds, which then evaporate, allowing the salt to fall down between the upright nozzles, and then immediately recondense. According to the inventors, this process allows 95% efficiency in the recovery of fresh water and separation of salts, compared to about 36% for other processes, so that the process is altogether about 3 times more efficient than other current methods and is about 4 times cheaper, both in terms of setup costs and operating costs. So instead of the usual price of about $2–2.5 per thousand gallons of sweetened water, the Aquasonics process is estimated to cost about $0.66 per thousand gallons—which is Approximately 0.70 Israeli Shekels per Kub, which thus makes it more or less equal for example to the price of natural water in Israel.

However, even the above better process still has a number of limitations: 1. Such small nozzles can easily become clogged by salt or other small particles such as for example sand, etc. 2. Since the salt falls down on the area of the nozzles, they have to be sufficiently apart from each other in order to give sufficient room to the salt to fall between them, and also the salt is actually falling over the path of newly injected droplets, so it can mix with some of them. 3. Creating a high pressure of about 10 Atmospheres, although of course much better than about 50 Atmospheres needed for reversed Osmosis, still consumes considerable energy, and normal pressure pumps have only limited efficiency, so only part of the energy goes to the actual speeding of the droplets. A better process that doesn't have these problems would be very desirable, since it could increase efficiency even further and reduce costs to even cheaper levels.

However, the 1982 (Secunda et. al.) patent was not limited to the use of air pressure—it mentioned for example also that "the spray of droplets of required size may be produced by forcing the liquid under pressure through a small aperture". It also used in one of the embodiments a rapidly rotating small cup of about 4 inch diameter on a horizontal axis of rotation. However, it used salty water solutions with at least 15% or more salt, which enabled the resulting salt particles to become large enough even with an initial water droplet size of a few microns. On the other hand, according to the tests conducted by Secunda et. al., increasing the initial water droplets size to tens of microns or more considerably increases the time needed for the droplets to evaporate—for example a water droplet at the size of 5 micron can evaporate in about 10 ms (milliseconds), but increasing the size to 30 microns can cause the evaporation time to go up to near 1 second or even more. This would be very problematic, since upon impact with the air the droplets quickly slow down, so after 1 meter they already move much slower or stop. But even if they didn't slow down before the end of the $1^{st}$ meter, since at a speed of 300 meters per second the droplets travel 1 meter in 3.3 ms, they would have to evaporate in less than 3 ms. However, according to Secunda et. al., a 20 micron diameter sphere injected into still air at the speed of sound would come to rest in about 7 cm and in a time of about 4 ms. And smaller spheres would stop even quicker. So if the above measurements and calculations of Secunda et. al. are correct, the process can work properly only with higher salt concentrations. When the salt concentration is lower as for example about 3% in sea water, water droplet size of a few microns would produce salt particles too small to fall down, and a water droplet with a size of 30 microns or more would require too much evaporation time. Therefore, better solutions are needed in order to solve this contradiction of parameters for desalination of sea water.

However, there is even a bigger problem with the above data—and that is the energy requirements. A physical energy calculation shows that in order to accelerate 1 Kub of water to 300 meters per second we need 12 Kilowatt-Hour of electricity, so at a cost of 7 cents per Kilowatt-hour, the mere energy requirements are 84 cents per Kub, and that is assuming that we have a 100% efficiency in recovering the desalinated water and no energy losses on the way. So of course the real costs are bigger. On the other hand, electricity costs vary a according to the time of day, etc., so the price can come to half if operated at night for example. The root of the problem is that in reverse osmosis a large percent of the energy of the high pressured water is recovered and reused, whereas the Kinetic energy of the flying droplets is lost.

SUMMARY OF THE INVENTION

The present invention tries to solve the above described problems by using a process that is even simpler and has less mechanical problems, and therefore can be even more energy efficient. There are a number of possible solutions: 1. A better solution is to use, instead of nozzles, holes in a water container, preferably for example with a container shaped like a cylinder or a ball. This is much better since there is much smaller danger of the holes getting clogged, and it is also much easier to clean them, and also this way the water droplets can fly in all desired directions instead of vertically. 2. Another possible solution is to use for example gravitational forces instead of a water pump. So in Israel for example water can be brought from the Mediterranean Sea and dropped down for example above the Dead sea into a water conductor that has holes in the appropriate depth and sizes to allow the water to fly out at the desired speeds. However, building such a conduit is expensive and can be used only at a small number of places in the world. 3. A still better solution is, to use instead of a water pump or pressure, centrifugal forces, which are more efficient since they are applied directly to throwing out the water droplets, with or without holes. However many improvements are shown also over the rotating cup described by Secunda at. al., which can allow much more control on the droplets size and speed, allow better separation of the water and the salt, and try to solve the above problem of contradicting parameters requirements for water with low concentrations of salt, such as for example sea water. This is the more preferred solution in the present invention.

Instead of using nozzles and compressors, which are by nature of limited efficiency, the present invention is based on holding saltwater in a main body which is preferably for example in the shape of a vertical cylinder with preferably small holes on its walls or for example a preferably large preferably parabolic open plate, as explained below in the reference to FIGS. 5*a–b* (for example 1 meter in diameter), which is rotated at high speeds, preferably around a vertical axis, thus throwing out water droplets by centrifugal forces. The vertical axis of rotation is more preferable than a horizontal one because is uses more efficiently the centrifugal forces and because it spreads the water and salt over a wider area, thus allowing more efficient separation of the water and the salt particles and with less problems. In the case of a cylinder, preferably, the cylinder is divided by vertical walls into a number of cells, in order to better rotate the water and reduce internal circulations of the water, which would be a waste of energy, as shown in FIGS. 1*a–c*. The size of the droplets and their speed can be affected for example by the size of the holes, the cylinder's diameter, the speed of the cylinder's rotation, the amount of mass of water, etc. Preferably, the water is run through a filter before entering the cylinder, to filter out larger particles that might clog the holes, such as for example sand. The elements that collect the speeding droplets are preferably vertical or tilted walls around the rotating cylinder, at a suitable distance from it. Of course, more than one set of cylinder and walls can be used. Preferably, it is rotated for example clockwise or counter clockwise, or for example once in a while reversed. This solves all of the above problems because: 1. The holes have less chance of becoming clogged than nozzles and are easier to clean. 2. The droplets fly out sideways, horizontally, and thus the salt falling down does not move back through the areas of the holes. 3. Since no pumps are used, the centrifugal forces are much more efficient in converting the rotational energy into speeding droplets.

Another possible variation is, instead of rotating a cylinder full of water, pouring in water slowly only as needed, preferably into the center of the cylinder, so that the cylinder does not have to rotate too much mass of water at each point in time. However, this does not make much of a difference, since even when rotating a larger mass of water, the accelerated mass remains in rotation until used, so the additional energy that is invested is not lost. Another possible variation is to add for example a preferably strong magnetic or electromagnetic or electrostatic field around the area where the droplets are evaporated and/or to the water or the salt, in order to further help the water and salt to be attracted to different directions. For example a negative or positive electrical charge can be added to the water, and since the salt solids retain the charge much more than the water droplets, the salt can then be attracted to the opposite electrical charge after the separation. Secunda et. al. used in some of the embodiments a strong electrostatic charge, but since their emphasis was mainly on extracting the salt, they placed a mirror target or a slowly rotating grounded disk perpendicular to the movement of the particles, which helps to collect the salt but can also block the passage of the water droplets. Therefore, a much better solution is to put the opposite charged element for example below the path of the particles, so that the salt is attracted downwards both by gravity and by the electric charge. Also, since imparting charge to the water in advance wastes additional energy, another possible variation is to use the preferably strong charge only near the droplets, so that the neutral particles become attracted to the charge, but the water and salt particles behave differently. Another possible variation is adding for example ultrasonic standing waves within the cells in order to further control the flow of the water and/or increase the force throwing the water out of the cylinder. Another possible variation is creating conditions of some under-pressure in the area surrounding the cylinder (for example by appropriate pump or bellows) and/or increasing the temperature, in order to even further reduce the amount of air that is around during the fast fluctuation process, so that even larger droplets can evaporate more quickly. Another possible variation is to use water with higher concentration of salt than sea water, for example by using water from the dead-sea in Israel (which has about 32% salts), or for example using the process on the salty waste water that comes out of a reverse osmosis desalination plant, which otherwise creates a serious disposal problem, especially in plants that are inland, or for example taking the seemingly absurd step of adding salt to the water before desalinating them. This way the resulting salt particles are big enough to drop easily even if the initial water droplets size is smaller. So for example some of the extracted salt can be used all the time for increasing the salt concentration in new sea water that is inserted into the process. Another possible variation is to use a strong magnetic field around the resulting salt particles, thus causing them to form larger chunks together. Another possible variation is to add to the water solution before the process some magnetic or magnetizeable and/or adhesive material that can easily attach to the salt, thus increasing the tendency of the resulting salt particles to condense in larger chunks and/or improving the separation of the salt by a magnetic or electromagnetic field, for example towards a charged area at the bottom, in addition to or instead of the electrostatic charge. One of the possible magnetizeable materials that can be added is for example Iron-based Celating agents, which can react with the salt around the iron molecules, thus making the resulting salt particles become magenetizeable. Another possible variation is that if the salt has already reacted with the Celating agent (for example after mixing and waiting sufficient time for the molecular kinetics to allow all or most of the salt to bind with it), then magnetic force is used to extract it directly out of the water without having to throw it as droplets, for example with the aid of creating a thin layer of water over a magnetic surface or for example passing the water through a magnetic sieve or for example though multiple magnetic elements with large surface area, for example in the shape of heat exchange radiator. Another possible variation is to take advantage of the fact that after the Celating agent has bound with the salt molecules we have a much larger molecule size (This can be used of course also for example with non-magnetic and/or non-magnetizeable Celating agents). This way the water can be passed through a membrane with holes larger than the membranes used for reverse osmosis, and thus lower pressure is needed and the process can work with less energy requirements. This type of solution can be used not only with Celates, but also with any other convenient type of preferably large molecules that can bind with the salt or make the salt crystallize into larger chunks. Another possible variation is that the time the binding molecules are allowed to react with the salt is changed according to the amount of salt that is desired to be left in the water after the process, so that for example if 0.5% is desirably left in the water, the binding agents are not left in the water long enough to bind with all the salt. Preferably after the separation from the water the binding agents are recycled. Another possible variation could be to use even higher speeds in order to allow larger droplets to evaporate even faster, however that would be even more wasteful of energy. A better solution is to reduce the water speed, for example to only 100 meters per second, preferably with even smaller droplet size, and use any of the above improvements in order to extract the salt despite creating smaller resulting salt particles. Another possible variation is to use for example a cup like the one described by Secunda et. al. with either a horizontal or vertical axis of rotation (or any other orientation, such as for example diagonal), but with any of the above improvements. Another possible variation is to use water pressure and narrowing nozzles like those described by Aquasonics, in a vertical or horizontal or diagonal or any other orientation, but with any of the above improvements. Of course, various combinations of the above and additional variations can also be used.

Another possible variation, shown in FIG. 2, is to independently rotate the cells themselves, or parts of them, or other elements, instead or in addition to the rotation of the cylinder itself, thus adding to the effect of throwing out the droplets also throwing out water already in the form of steam, created by cavitation. Another possible variation is to create a cavitation effect in addition or instead also in the air itself where the droplets are flying, for example by using a propeller or a piston or a rotating wing for intermittently changing between lower and higher pressures.

Other possible variations, shown in FIGS. 3*a–b* is to use instead of a vertical cylinder, for example a shape of a cone, or of two reversed cones, so that for example the wider bases face each other in the middle. This has the advantage that the water droplets get additional boost by the diagonal shape of the wall and are more concentrated in a certain horizontal plane. Another possible variation is to use instead of the shape of a round cylinder for example a multifaceted round body, as shown in FIG. 3*c*. Another possible variation, shown in FIG. 3*d*, is that the cylinder is hollow in the middle, so that the water is only in the circumference, and the cylinder is connected to the central hinge for example by metal bars. This can make it more efficient by avoiding unnecessary spinning of the water in the central part. Another possible variation, shown in FIGS. 3*f–g*, is for example to add to the cylinder preferably small vertical water-filled wings on the outside, so that, instead of in the circumference, the holes are in the for example in the back-part or in the front part of each wing, so that the water that comes out of the holes on each wing is thrown both by the centrifugal forces and by the speed of the wing itself—in a direction that is both away from the cylinder and backwards in the opposite direction of the movement of each wing. Of course, various combinations of the above and additional variations can also be used.

Another possible variation, shown in FIGS. 4*a–c*, is to use instead of the cylinder for example a large flat round surface, preferably also separated into cells by vertical walls, so that water is preferably continuously poured on the center of the surface and the centrifugal forces disperse it into small droplets that fly out at the open ends of the cells. Another possible variation is to add for example small teeth at the circumference of the surface in order to further help create the required size of droplets. Another possible variation is to add a top to the surface, so that the vertical walls are between two round surfaces, in order to prevent the water from trying flying upwards to escape the centrifugal forces. Another possible variation, shown in FIG. 5*a*, is to use a bowl-like surface instead of the flat surface, so that as the water layer gets closer to the periphery it gets thinner and thinner, preferably, close to the thickness of the required droplets size. Another possible variation is to cover this bowl-like surface with a cover, which can be for example a reversed similar upside-down bowl, or a flat surface, as shown in FIG. 5*b*. Another possible variation is to add a hydrophobic substance at least at the edges or periphery of the bowl-like or flat surface (or at the round walls of the cylinder, in the variations where a cylinder is used), such as for example Teflon, so that the water droplets fly off more easily. On the other hand, hydrophobic materials can cause the water to slip instead of rotating with the object, so preferably most of the rotating body is covered with hydrophilic materials and the hydrophobic materials are preferably only at the extreme edges. The desalination device itself can be used for example at an installation where water is brought from the sea, desalinated, and the waste products are conveyed back to the sea, except that, unlike for example in reversed osmosis, the waste is mainly dry salt, so there is no need to convey back salty water to the sea, and, in fact, the salt itself can be sold. Another possible variation is to install and operate the device at sea itself, which saves the cost of installations for sea water conduction and pumping, as shown for example in FIG. 5*c*.

Of course, various combinations of the above and additional variations can also be used.

IMPORTANT CLARIFICATION AND GLOSSARY

All these drawings are exemplary drawings. They should not be interpreted as literal positioning, shapes, angles, or sizes of the various elements. Throughout the patent when variations or various solutions are mentioned, it is also possible to use various combinations of these variations or of elements in them, and when combinations are used, it is also possible to use at least some elements in them separately or in other combinations. These variations are preferably in different embodiments. In other words: certain features of the invention, which are described in the context of separate embodiments, may also be provided in combination in a single embodiment. Conversely, various features of the invention, which are described in the context of a single embodiment, may also be provided separately or in any suitable sub-combination.

DETAILED DESCRIPTION OF THE PREFERRED EMBODIMENTS

All of the descriptions in this and other sections are intended to be illustrative examples and not limiting.

Figure 1A:
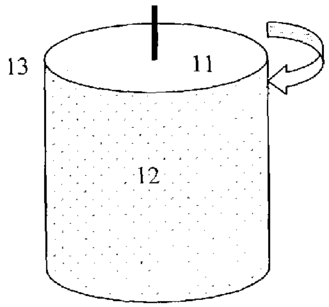
FIGS. 1*a–c* are illustrations of a side-view and top-view of preferable embodiments of a cylinder with preferably small holes on its walls, which is rotated at high speeds around a preferably vertical axis.
Figure 1B:
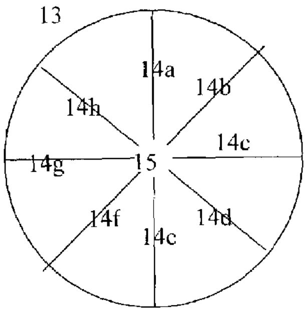
Figure 1C:
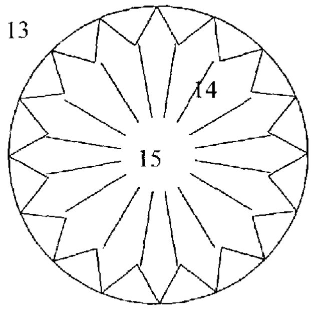

Referring to FIGS. 1*a–b*, we show illustrations of a side-view and top-view of a preferable embodiment of a cylinder (13) containing water(11), with preferably small holes on its external walls (12), which is rotated at high speeds around a preferably vertical axis (10), thus throwing out water droplets by centrifugal forces. Preferably, the cylinder is divided by vertical walls (depicted in this example as 14*a*–14*h*, but of course any convenient number of walls & cells can be used) into a number of cells, in order to better rotate the water and reduce internal circulations of the water (11), which would be a waste of energy. The cells can be for example wider at the circumference, as shown in FIG. 1*b*, or for example narrower as they reach the edges of the cylinder, as shown in FIG. 1*c*. Preferably, at the center of the cylinder there is an area of water free of internal walls (15), where preferably new water is added to the cylinder to be processed. The size of the droplets and their speed can be affected by the size of the holes, the cylinder's diameter, the speed of the cylinder's rotation, and the amount of mass of water, so that preferably the droplets are at the recommended range of 30–100 micron. Of course, the cylinder has a bottom that holds the water, and preferably it has also a top cover, so that water does not spill out from the top, preferably with a small hole at the center of the cover for inserting new water into the cylinder. Preferably in different embodiments. The cylinder can be for example more or less full of water all the time, or water can be constantly poured (preferably into the center of the cylinder) at a constant rate, without letting the cylinder contain at any given time more water then needed according to the rate of water leaving it. Preferably, the water is run through a filter before entering the cylinder, to filter out larger particles that might clog the holes, such as for example sand. The elements that collect the speeding droplets are preferably vertical or tilted walls around the rotating cylinder, at a suitable distance from it, such as for example 30–100 cm, since the speed of the droplets very rapidly slows down across such distances. Of course, more than one set of cylinder and walls can be used. Preferably, it is rotated for example clockwise or counter clockwise, or for example once in a while reverses its direction. This solves all of the above problems because: 1. The holes have less chance of becoming clogged than nozzles and are easier to clean. 2. The droplets fly out sideways, horizontally, and thus the salt falling down does not move back through the areas of the holes. 3. Since no pumps are used to push the water, the centrifugal forces are much more efficient in converting the rotational energy into speeding droplets.

Figure 2:
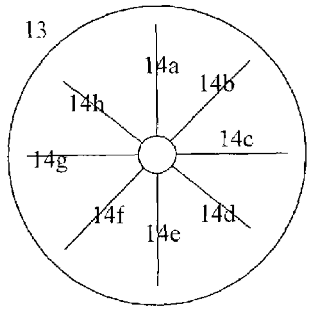
FIG. 2 is an illustration of another possible preferable variation, where the cells themselves, or parts of them, rotate instead or in addition to the rotation of the cylinder itself, thus adding to the effect of throwing out the droplets also throwing out water already in the form of steam, created by cavitation.

Referring to FIG. 2, we show an illustration of another possible preferable variation, where the cell walls themselves (14*a*–14*h*), or parts of them, and/or other elements, rotate instead or in addition to the rotation of the cylinder (13) itself, thus adding to the effect of throwing out the droplets also throwing out water already in the form of steam, created by cavitation. Of course, various combinations of the above and additional variations can also be used.

Figure 3A:
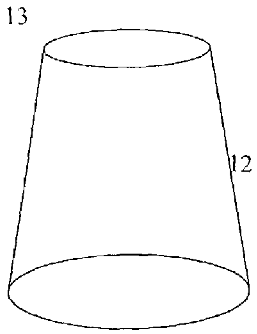
FIGS. 3*a–i* are illustrations of other possible preferable variations, where instead of a simple cylinder, other similar forms are used.
Figure 3B:
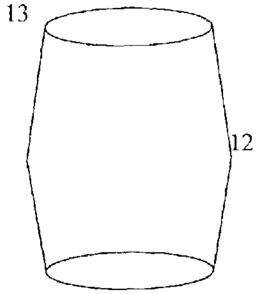
Figure 3C:
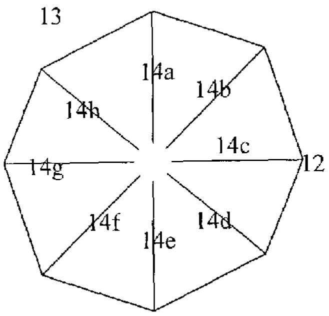

Referring to FIGS. 3*a–c*, we show illustrations of other possible preferable variations, where instead of a simple cylinder, other similar forms are used instead of a cylinder with vertical walls. FIG. 3*a* shows for example a cylinder (13) where the walls (12) are in the shape of a cone, which can be for example with the wider side up or with the wider side down. This has the advantage that the gradient gives the water an additional boost, and the streams of droplets flying out of the cylinder are concentrated mainly in one horizontal plane surrounding the level where the circumference of the cylinder is widest, thus avoiding the problem that some salt falling from droplets at higher positions might recombine with droplets flying at lower positions. Similarly, FIG. 3*b* shows a cylinder in the form of two reversed cones, so that for example the wider bases face each other in the middle, so in this case most of the droplets fly out at the middle section. Of course, this effect both in FIG. 3*a* and FIG. 3*b*, can be further increased for example by making the holes only at the area of the widest circumference and/or by making the height of the cylinder shorter than it's diameter. Of course this shortening of the height of the cylinder can be done also for example in the variations described in FIGS. 1*a–c,* even until the extreme case where vertically there is room for only 1 or a few horizontal planes of holes. These cones are also preferably divided into internal cells like in FIGS. 1*a–c*. Another possible variation is to use instead of the shape of a round cylinder for example a multifaceted round body, as shown in FIG. 3*c*. Of course, various combinations of the above and additional variations can also be used. Another possible variation, shown in FIG. 3*h,* is to use a number of horizontal walls or "floors" around the cylinder in order to prevent salt falling from droplets at higher positions from recombining with droplets flying at lower positions. Preferably at each such "floor" for example a conveyor belt is used to remove the salt the accumulated on it. Another possible variation, shown in FIG. 3*i,* is to use a number of separate cylinders (or one cylinder separated into vertical sections), so that preferably they all use a common hinge, and walls separate between each section. Another possible variation is to use the very fact that some salt from above may recombine with water droplets flying at lower levels in order to leave a certain amount of salt in the water, since typically sweetened or distilled water has too little salt and some salt needs to be added back, otherwise it is less pleasant to drink and also the lack of calcium can cause more corrosion of the pipes. In addition to this, unlike for example reversed osmosis, where it is harder to control the final percent of salt in the water, the present invention can have the additional advantage of making it very easy to fine-tune the amount of remaining salt for example by changing the number of holes on the higher levels compared to the number of holes on the lower levels (for example by using less holes on the higher levels the final salt level can be made lower), and/or by changing the shape of the walls to more straight or less straight, and/or by changing the number of levels of holes and/or the number of horizontal floors that separate between groups of hole lines. This way for example different levels of salt can be created for agricultural needs of different kinds, for drinking, or for industrial or other uses.

Figure 3D:
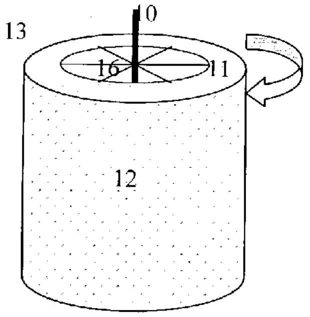

Referring to FIG. 3*d,* We show a preferable variation where the cylinder (13) is hollow in the middle, so that the water (12) is only in the circumference (11), and the cylinder is connected to the central hinge for example by metal bars (16). This can make it more efficient by avoiding unnecessary spinning of water in the central part. However, adding water directly to the circumference might cause turbulence because the new stream of water is inserted directly into the fastest moving area. Therefore, another possible variation is to add the water at the hinge and let it flow through hollow conduits into the round part containing the water at the circumference. These conduits can be implemented for example by making the bars (16) hollow and preferably elongated along the height of the cylinder. Of course, various combinations of the above variations can also be used.

Figure 3E:
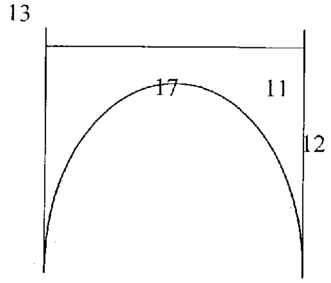

Referring To, FIG. 3*e,* we show a side-section view of another preferable variation in which the mass of water (11) in the middle is reduced by having the bottom floor (17) of the cylinder (13) higher in the middle. This achieves the same effect as in FIG. 3*d,* without the problem of how to add the water in the middle. Of course, various combinations of the above and additional variations can also be used.

Figure 3F:
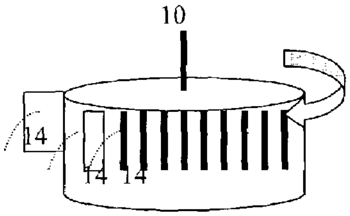
Figure 3G:
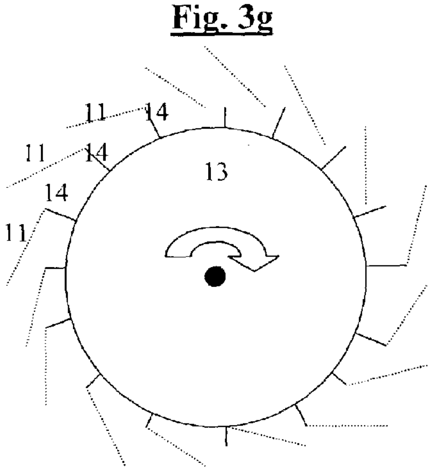

Referring to FIGS. 3*f–g,* we show a top-view and side-view of another possible variation, in which the cylinder (13) has preferably small vertical water-filled wings (14) on the outside, so that, instead of in the circumference, the holes are for example in the back-part or the front part of each wing, so that the water (11) that comes out of the holes is thrown both by the centrifugal forces and by the speed of the wing itself—in a direction that is both away from the cylinder and backwards in the opposite direction of the movement of each wing. Preferably there is more than one hole on each wing, and these holes are preferably near the outer edge of the wing. This way the wings also help create additional vacuum in the area where the water flies out. Preferably these wings are protruding only a small distance form the cylinder in order to avoid increasing too much the air resistance.

Figure 3H:
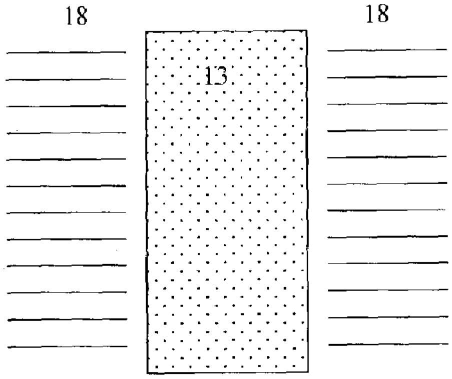

Referring to FIG. 3*h* we show a side-view cross-section of a preferable variation where number of horizontal walls or "floors" (18) are used around the cylinder (13) in order to prevent salt falling from droplets at higher positions from recombining with droplets flying at lower positions. Preferably at each such "floor" for example a conveyor belt is used to remove the salt that accumulates on it. In this and other versions preferably friction-reducing bearings are used to support the hinge both at the top and the bottom of the cylinder.

Figure 3I:
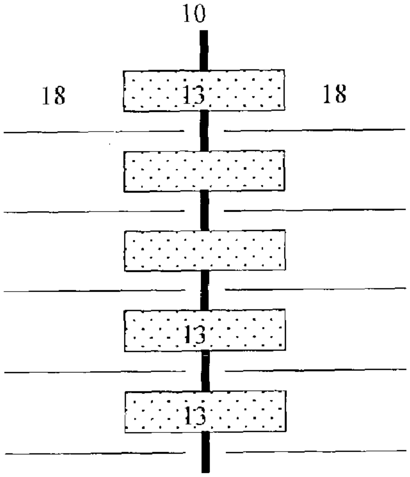

Referring to FIG. 3*i* we show a side-view cross-section of a preferable variation where a number of separate cylinders (or one cylinder separated into vertical sections) (13) are used, so that preferably they all use a common hinge (10) and preferably more than one set of friction-reducing bearings are used to support the hinge, and horizontal walls or "floors" (18) separate between each two sections, in order to prevent salt falling from droplets at higher positions from recombining with droplets flying at lower positions. Preferably at each such "floor" for example a conveyor belt is used to remove the salt that accumulates on it.

Figure 4A:
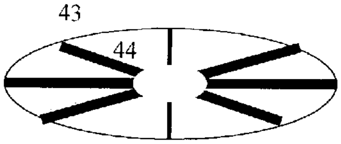
FIGS. 4*a–c* are illustrations of preferable variations in which, instead of a cylinder, for example a large flat round surface is used.
Figure 4B:
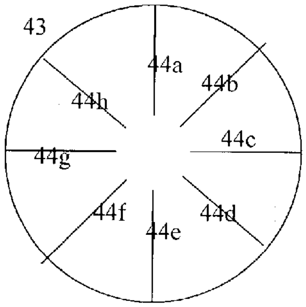
Figure 4C:
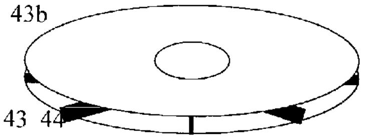
Figure 5A:
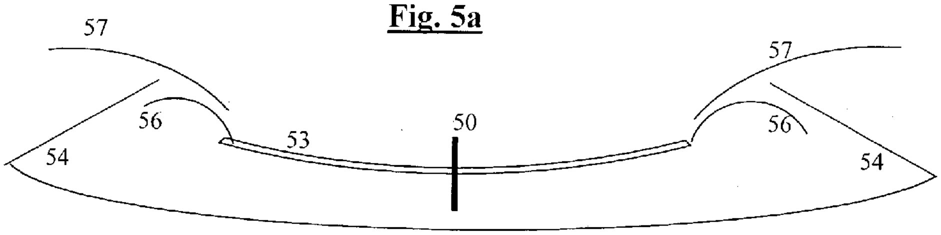
FIGS. 5*a–b* are illustrations of other preferable variations of using a bowl-like surface instead of the flat surface, so that as the water layer gets closer to the periphery it gets thinner.

Referring to FIGS. 4*a–c,* we show illustrations of preferable variations in which, instead of a cylinder, for example a large flat and preferably round surface (43) is used. This surface is preferably also separated into cells by vertical walls (44, 44*a*–44*h*), so that water is preferably continuously poured on the center of the surface and the centrifugal forces disperse it into small droplets that fly out at the open ends of the cells. Another possible variation is to add for example small teeth at the circumference of the surface in order to further help create the required size of droplets. Another possible variation is to add a top (43*b*) to the surface, so that the vertical walls are between two round surfaces, in order to prevent the water from trying to fly upwards to escape the centrifugal forces. Another possible variation is to use for example a cylinder or surface that is not horizontally symmetrical, such as for example an elliptical surface. Of course, various combinations of the above and additional variations can also be used Referring to FIGS. 5*a–b,* we show a side-section view of other preferable variations of using a bowl-like surface (53) instead of the flat surface, so that as the water layer gets closer to the periphery it gets thinner. Preferably this bowl-like surface has a parabolic shape, like a satellite dish, since the natural tendency of the water is to adopt a parabolic shape during the rotation, so this can help create a more regular thickness of the level of water on the surface and ensure that the droplets fly mainly in the desired direction. Also, preferably this surface is considerably larger than the 4 inch cup used by Secunda et. al., for example 1 meter in diameter, which allows much more efficient utilization of the centrifugal forces at a lower speed, than a small rotating object at a higher speed. Another possible variation is making the bowl more concave so that it can for example help prevent the water droplets from detaching too early before they reach the edge, however that should not happen anyway as long as the surface is not flatter than the parabolic shape. Preferably, the bowl-like surface rotates around a vertical axis (50). Preferably, water is constantly poured on the center of the surface, and by controlling for example the amount of water, the diameter of the surface, the gradient of the curve of the surface, and the speed of rotation, the desired speed and size of the droplets that fly out of the periphery of the surface can be controlled. Preferably, the thickness of the water layer at the periphery before it flies out of the edges is close to the desired diameter of the droplets. Due to the energy considerations expressed above preferably the speed is considerably lower than 300 meters per second—for example only 100 meters per second or even less (for example with a dish of 1 meter diameter, the rotation speed for this might be about 2,000 RPM or less), which requires 9 times or less energy, and therefore preferably the initial water droplet size is designed to be even smaller, in order to be able to evaporate quickly at these lower speeds (for example even 1 micron or less, for example by pouring the water at a slower rate, so that as the water reaches the edges it is already a very thin surface). In order to solve the problem of having to deal with the much smaller resulting slat particles, any of the above methods explained in the summary section can be used, such as for example adding salt in advance, using a large electrostatically charged object that does not obstruct the water droplet path, and/or using the preferably strong magnetic or electromagnetic field, with or without pre-adding magnetic material to the water. However, the design of the vertically spinning surface has the advantage that an additional method can be used in addition to or instead of the above: Preferably a concentric preferably diagonal large ring (54), with or without a static charge, is used around the device at an appropriate distance, so that the salt particles path (56) ends before and thus preferably below the ring (since the salt particles are smaller and thus lose more momentum), and the water droplets path (57) continues beyond and thus preferably above the ring, since the larger water particles retain a stronger momentum and are also partly absorbed by the air. An additional preferably weak circumferential suction pump can further be used to suck the water droplets. Such a natural separation can occur better then with the horizontally rotating cup described by Secunda et. al., since there both the water and salt particles are concentrated in a too small area and for example salt from the higher part of the path can mix with water from the lower part. Another possible variation is the reverse from this—putting the ring at a position where there is more water before the ring and more salt after it, since the water might lose more momentum due to its transformation to vapor and back. Another possible variation is to use for example more than one ring or element, so that the closer element gets more water (or salt) and the further one gets more salt (or water). Another possible variation is to control the salt levels of the final water for example by changing the position of the ring so that the separation becomes more or less optimal so that for example more or less salt remains depending on the desired use of the water. Another possible variation that can work also with larger droplet size and/or slower speeds is that the droplets do not have to dehydrate completely, and the extraction is based on using only the part that evaporated and disposing of partly dehydrated droplets together with the salt or separately. Another possible variation is that, since the smaller salt droplets might be spread all around due to the Brownian motion, the salt particles might be for example in a sphere or ball or an ellipse surrounding the rotating body, and the water for example might be in a larger sphere or ellipse that surrounds the smaller one, or vice versa, but anyway the larger water particles are more affected by gravity than the salt particles, and therefore the overlap between the spheres or balls or ellipses can be even smaller. Therefore, Another possible variation is that the water and the salt particles that are in the air are separated by any mechanism that takes into account the different spatial dispersions of the water and of the salt particles and/or the different effect of gravity on them. Another possible variation is for example recovering some of the kinetic energy of the water droplets and/or of the salt particles when they hit the ring or any other mechanical element, and/or recovering some energy from the generated air currents. Another possible variation is that in order to have more control on the size of the droplets that eventually disengage from the edges of the rotating body, preferably there is some gradient from the center to the edges of the rotating body, so that preferably the material for the surface of the rotating body becomes gradually less hydrophilic and/or more hydrophobic from the center towards the periphery. Another possible variation is to use for example various other combinations of less and/or more hydrophilic and/or hydrophobic materials, and or various walls or bulges or structures that prevent the water from sliding during the rotation even with surface materials to which the water adhere less, as explained above. Another possible variation is to use for example a gradient of electrical charges so that the charge for example becomes gradually positive towards the periphery, since the water is more attracted to negative charge. This can be used also for example in combination with the variations that use an electrostatic charge to help separate the water droplets from the salt particles. Another possible variation is to use for example a gradient of materials that contain less Oxygen towards the periphery, since water is attracted more to materials containing Oxygen. Of course various combinations of the above and other variations can also be used.

Figure 5B:
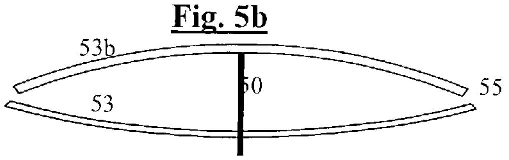

Another possible variation is to add vertical walls that divide it into cells, like in the other variations, however if the water is constantly added on the fly without filling up the bowl-like surface, the water can get the rotational push from the surface itself even in the variation without walls, which can help make the spreading of the water more even in all the horizontal directions. Another possible variation is to add preferably on the edge of the periphery of the bowl-like surface, all around, a tooth-like or zigzag edge with small grooves, in order to further help break down the water into the required size of droplets at the point where the water is about to fly off the edge. Another possible variation, shown in FIG. 5*b*, is to cover this bowl-like surface (53) with a cover (53*b*), which can be for example a reversed similar upside-down bowl, or a flat surface. Preferably the edges of the two reversed bowls on the periphery (55) are almost touching each other all around, for example with a gap of around 1 mm or more or less. Another possible variation is to use similarly for example a flat top instead of the reversed-bowl top. Another possible variation is to use for example a number of such bowl-shaped surfaces on top of each other with certain distances between them, preferably sharing the same hinge, with or without floors or partial floors that separate between them, in a way similar to FIGS. 3*h–i*. Of course, various combinations of this and other variations are also possible.

Figure 5C:
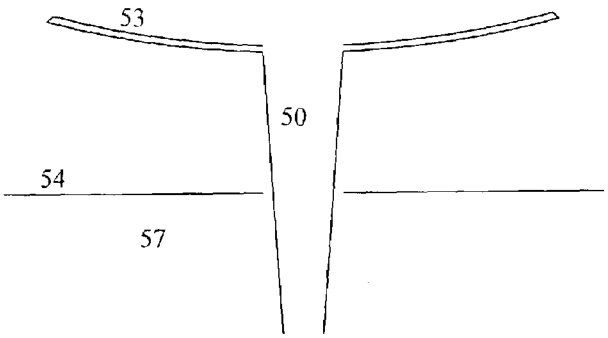
FIG. 5*c* is a side-view cross-section of a preferable variation where the desalination device is installed and operated at sea.

Referring to FIG. 5*c*, we show a side-view cross-section of a preferable variation where the desalination device is installed and operated at sea. In this example we show a bowl-like surface (53), however a similar solution can be used also with other types of rotating objects as described in this invention. However, the hinge (50) in this example is preferably for example a hollow vertical cone which is narrower at the bottom than at the top, and is partly submerged below the sea surface (54), so that the centrifugal forces cause the sea water (57) to crawl up the hollow hinge (50) without the need for a pump. Preferably, except for the elements around the rotating body which collect the water droplets, there are farther away also walls that encircle the area in the sea in order to prevent waves from interfering with the process, and/or the device can be for example designed to float on the water, so that it is less affected by waves. The resulting salt can be allowed to drop back directly to the sea, or for example collected by conveyor belts in order to be sold separately. Another possible variation is to use an ordinary pump at the sea. If pre-filtering is used for example for getting rid of elements such as for example sand and algae, a number of solutions are possible, such as for example: 1. Use a pump for the pre-filtering the water and feed the water into a pre-filtered-water pool and activate the device (or devices) in that pool. 2. Use a pump and pre-filtering before the water enters the hollow cone. 3. Add the pre-filter inside the cone, so that the centrifugal forces pull he water up also through the pre-filter. 4. Use the filtering AFTER the desalination, for example at the elements that capture the water droplets after they fly away from the rotating object, or afterwards. Additional variations and combinations are also possible. However, when using a bowl-like or flat object instead of the cylinder with holes, the need for this pre-filtering is less important because there are no holes that can get clogged anyway.

While the invention has been described with respect to a limited number of embodiments, it will be appreciated that many variations, modifications, expansions and other applications of the invention may be made which are included within the scope of the present invention, as would be obvious to those skilled in the art.

We claim:

1. A method of efficient desalination of saltwater and/or separating saltwater into salt and water, comprising the steps of:

a. Providing saltwater to a centrifugally rotating body with a non-horizontal axis of rotation and generating by the centrifugal forces of said rotating body streams of speeding saltwater droplets that fly into the air away from said rotating body, briefly evaporate, drop the salts, and then re-condense into salt-free water or into water with a reduced amount of salt, without using nozzles and pressure pumps to generate said streams, and without using reverse osmosis membranes; and:

b. Using a separate device around the rotating body to collect the re-condensed water separately from the salts.

2. The method of claim 1 wherein said rotating body is a hollow cylinder with round walls at said cylinder's circumference, and said cylinder rotates in a substantially vertical axis of rotation, and the saltwater is fed into said cylinder so that the saltwater is contained within said cylinder.

3. The method of claim 2 wherein the saltwater is fed into said rotating cylinder and further comprising at least one of the following:

a. The round walls of said cylinder are perforated by small holes;

b. Said cylinder is further divided into cells by vertical walls in order to better rotate the saltwater and reduce the waste of energy caused by internal circulations of water;

c. There is at least one part within said cylinder which can rotate independently of the rotation of said cylinder, thus creating also cavitation effects;

d. The round walls of said cylinder are at least one of: Made of multiple flatter facets, and tilted in the shape of at least one cone.

4. The method of claim 3 wherein the round walls of said cylinder are perforated by small holes and the percent of salt in the desalinated water can be controlled by at least one of: changing the number of holes on higher levels compared to the number of holes on lower levels, changing the shape of the walls of said cylinder to more straight or less straight, using more or fewer vertical levels of holes, and using more or fewer horizontal walls to separate between groups of hole lines.

5. The method of claim 1 wherein said rotating body is a surface which rotates in a substantially vertical axis of rotation, and the saltwater is fed as a layer on top of said rotating surface.

6. The method of claim 5 wherein the saltwater is fed to said rotating surface, and further comprising at least one of the following:

a. Said rotating surface has a center and edges and the saltwater is added to the center of said rotating surface, and the centrifugal forces disperse said water into small droplets that fly out at the edges of said rotating surface;

b. The size of the droplets is controlled at least partially by small teeth at the circumference of said rotating surface;

c. Reducing the thickness of the layer of saltwater on said rotating surface by using a rotating surface that is bent so that said rotating surface gradually becomes higher towards its periphery;

d. Said rotating surface is bent into a shape of a parabolic plate;

e. Said rotating surface is further divided into cells by vertical walls in order to better rotate the saltwater and reduce waste of energy that is caused by internal circulations of water;

f. Helping the saltwater droplets fly off more easily at the edges of said rotating surface by using a hydrophobic material at the edges of said rotating surface;

g. Preventing the saltwater from trying to fly upwards to escape the centrifugal forces, by using another surface on top of said rotating surface;

h. Controlling the size of the droplets also by using another surface on top of said rotating surface with a gap between said two surfaces, so that the gap between said two surfaces at least partially affects the size of the generated flying water droplets.

7. The method of claim 6 wherein said rotating surface has a center and a periphery, and there is some gradient from the center to the periphery of said rotating surface, so that the said rotating surface becomes gradually less hydrophilic and/or more hydrophobic from the center towards the periphery by at least one of:

a. Using a gradient of hydrophilic and/or hydrophobic materials;

b. Using a gradient of electrical charges so that said electrical charges become gradually positive towards the periphery of said rotating surface, since water is more attracted to negative charge;

c. Using a gradient of materials that contain less Oxygen towards the periphery of said rotating surface, since water is attracted more to materials containing Oxygen.

8. The method of claim 5 further comprising reducing the thickness of the layer of saltwater on said rotating surface by using a rotating surface that is at least one of:

a. Bent so that said rotating surface gradually becomes higher towards its periphery;

b. Bent into a shape of a parabolic plate.

9. The method of claim 8 further comprising at least one of:

a. Using at least two rotating bodies that share a common hinge;

b. Using at least two rotating bodies that share a common hinge, and using horizontal walls that prevent salt particles dropped from higher flying saltwater droplets from falling over water droplets that are flying from lower places.

10. The method of claim 1 wherein the saltwater is pre-filtered in order to remove at least one of sand and other particles that might cause clogging.

11. The method of claim 1 wherein the rotating body is installed and operated at sea, and the rotating body has a hinge which is a hollow vertical cone which is narrower at the bottom than at the top and is partly submerged below the sea surface, so that the centrifugal forces cause the sea water to crawl up said hollow cone without the need for a pump.

12. The method of claim 1 wherein at least one of the following is used to help separate the salt:

a. A strong electrostatically charged object is used to help separate the dropped salt from the flying water droplets;

b. Additional salt is added to the saltwater before generating the flying water droplets, in order to increase the size of dropped salt particles;

c. At least one of a magnetic and electromagnetic field is used to help dropped salt particles in the air form larger chunks;

d. At least one of a magnetic and a magnetizable material is added to the saltwater before generating the flying water droplets in order to make salt particles which are dropped from the flying water droplets become more easy to manipulate by a magnetic field;

e. A material with molecules which are larger than salt molecules which is adapted to bind with the salt is added to the saltwater before generating the flying water droplets, so that salt particles which are dropped from the flying water droplets become part of molecules which are bigger than salt molecules;

f. A material that is adapted to make the salt crystallize into chunks larger than salt molecules is added to the saltwater before generating the flying droplets, in order to increase the size of salt particles which are dropped from the flying droplets.

13. The method of claim 12 wherein the magnetizable material is Iron-based Celating agents, which react with salt in the saltwater, thus making the salt become magenetizeable.

14. The method of claim 1 wherein the saltwater is fed into said rotating body and said rotating body is a rotating hollow cylinder with round walls at its circumference and said cylinder has also vertical hollow water-filled wings on the outside of said round walls, each such wing containing holes which are in at least one of the back-part and front part of each wing, so that the saltwater that comes out of the holes on each wing is thrown out both by the centrifugal forces and by the speed of the wing itself.

15. The method of claim 1 wherein the flying water droplets and the salt that drops out of the flying water droplets move in the air in different paths, and the separate device used around the rotating body is a ring which is used around the rotating body at an appropriate distance, so that at least one of the salt particles' path and the water droplets' path ends before the ring, and at least one of the salt particles' path and the water droplets' path continues beyond said ring.

16. The method of claim 15 wherein at least one of the following exists:

a. Said ring which is used around the rotating body is electrostatically charged;

b. A circumferential suction pump is used to suck the flying water droplets after said flying water droplets have dropped the salt;

c. The amount of salt in the resulting desalinated water can be controlled by changing the position of said ring.

17. The method of claim 1 wherein the speed of the flying saltwater droplets is 100 meters per second or less and said flying droplets evaporate because small droplet size is used.

18. The method of claim 1 wherein said method is used on salty waste water that comes out of a reverse osmosis desalination plant.

19. The method of claim 1 wherein the flying droplets do not have to dehydrate completely, and the desalination is based on using as desalinated water only flying water droplets that evaporated and re-condensed, and disposing of partly evaporated droplets.

20. The method of claim 1 wherein the re-condensed water is collected separately from the dropped salt by using at least two elements around the rotating body, so that one element is closer to the rotating body than the other element, and the closer element gets more water and the further element gets more salt.

21. The method of claim 1 wherein the re-condensed water is collected separately from the dropped salt by using at least two elements around the rotating body, so that one element is closer to the rotating body than the other element, and the closer element gets more salt and the further element gets more water.

22. The method of claim 1 wherein at least one of a magnetic material and a magnetizeable material that is adapted to bind with the salt is added to the saltwater so that the salts become more easy to manipulate by a magnetic field.

23. The method of claim 22 wherein at least one of the following features exists:

a. Said magnetizable material is Iron-based Celating agents, which react with salt in the saltwater, thus making the salt become magenetizeable;

b. Salt is removed out of the saltwater at least partially by magnetic means;

c. Salt is removed out of the saltwater by at least one of: a magnetic surface, a magnetic sieve, and multiple magnetic elements with large surface areas.

24. The method of claim 1 wherein salt can be converged into larger structures by at least one of:

a. Adding to the saltwater a material with molecules larger than salt molecules, which is adapted to bind with salt;

b. Adding to the saltwater a material that is adapted to make salt converge into structures larger than salt molecules;

c. Adding to the saltwater Celating agents, which are adapted to react with salt.

25. The method of claim 24 wherein at least one of the following features exists:

a. The larger molecules that are created by binding with the salt can be filtered out of the saltwater by letting the saltwater pass through a sieve with larger holes than those used with reversed osmosis, and thus less energy is needed for the process;

b. The time that the binding molecules are allowed to react with the salt is changed according to the amount of salt that is desired to be left in the water after the process.

26. The method of claim 1 wherein the flying water droplets and the salt which is dropped by said flying water droplets in the air are further separated by a mechanism that takes into account different spatial dispersions of the flying desalinated water droplets and of the dropped salt and/or different effect of gravity on the flying desalinated water droplets and on the dropped salt.

27. A system for efficient desalination of saltwater and/or separating saltwater into salt and water, comprising:

a. A centrifugally rotating body with a non-horizontal axis of rotation, wherein said rotating body contains saltwater and generates by centrifugal forces, without nozzles and pressure pumps and without reverse osmosis membranes, streams of speeding saltwater droplets that fly in the air away from said rotating body, briefly evaporate while in the air outside of said rotating body, drop the salts, and then re-condense; and b. A separate device which surrounds the rotating body and collects the re-condensed water separately from the salt.

28. The system of claim 27 wherein the rotating body is a surface with a substantially vertical axis of rotation, with a layer of saltwater on top of said rotating surface, wherein said surface has a center and a circumference/periphery/edges.

29. The system of claim 28 wherein at least one of the following features exist:

a. Said rotating surface has a center and edges and enables adding saltwater to the center of said rotating surface, and the centrifugal forces disperse said saltwater into small droplets that fly out at the edges of said rotating surface;

b. There are also small teeth at the circumference of said rotating surface in order to enable at least partial control of the size of droplets;

c. Said rotating surface is bent so that said rotating surface gradually becomes higher towards its periphery, so that the layer of water gets thinner as it comes closer to the periphery of said surface;

d. Said rotating surface is bent into a shape of a parabolic plate;

e. Said rotating surface is further divided into cells by vertical walls in order to better rotate the saltwater and reduce waste of energy by internal circulations of water;

f. There is a hydrophobic material at the edges of said rotating surface;

g. Said rotating surface has another surface on top, in order to prevent the saltwater from trying to fly upwards to escape the centrifugal forces;

h. Said rotating surface has another surface on top of said rotating surface with a gap between said two surfaces, so that the gap between said two surfaces at least partially affects the size of the generated flying water droplets.

* * * * *